March 14, 1961  S. C. RICHEY  2,974,916
FLEXIBLE RETAINER
Filed July 18, 1958
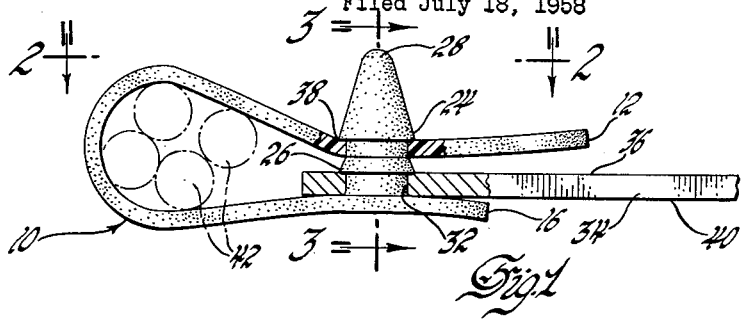
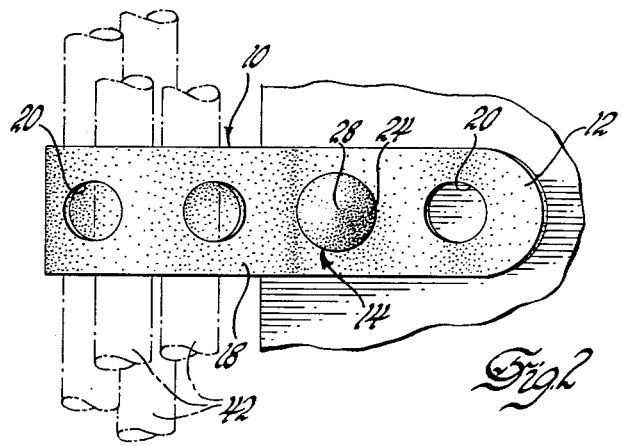
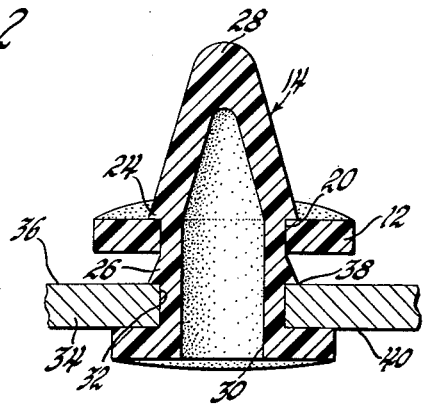
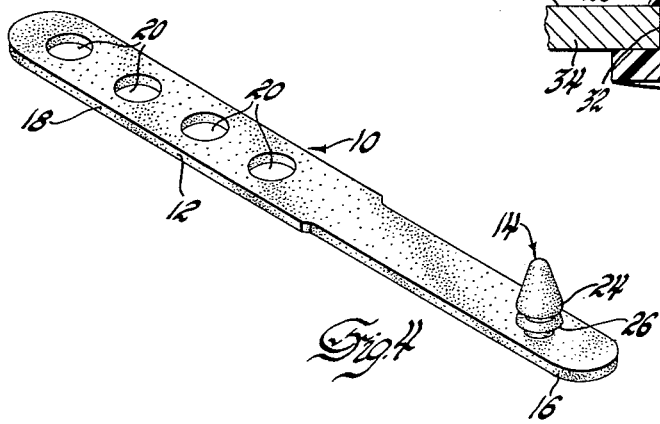
INVENTOR.
Shirrell C. Richey
BY
ATTORNEY

United States Patent Office 2,974,916
Patented Mar. 14, 1961

2,974,916

FLEXIBLE RETAINER

Shirrell C. Richey, Birmingham, Mich., assignor to General Motors Corporation, Detroit, Mich., a corporation of Delaware Filed July 18, 1958, Ser. No. 749,349

2 Claims. (Cl. 248—71)

The invention relates to a flexible retainer formed as a strap and made of plastic or other suitable material. The retainer may be employed to mount and retain articles such as rods, tubes, or wires when such articles are to be secured to a supporting wall adjacent one edge thereof.

Retainers embodying the invention are desirable in the process of assembly of machinery and other products of manufacture to provide for quick installation and positive retention of wiring, tubing, and other such articles. It is preferable to provide retainers which may be readily fastened to a support and held in that position until it is desirable to insert the articles to be mounted and fasten them to the support. The invention contemplates retainers which are easily secured about the element to be supported and do not require extreme accuracy in location. Such retainers have the advantages of ease of handling, simplicity of manufacture, and unitary construction. They are preferably made of a resilient plastic material which also effectively insulates the mounted article electrically, thermally, and mechanically from the supporting structure. Retainers embodying the invention therefore act as heat and vibration blocks so that heat and vibration are not easily transferred between the articles mounted and the supporting structure. The retainers may be quickly and easily secured in place and readily removed if desired.

In the drawing:

Figure 1 is a side elevation view of a retainer embodying the invention showing the retainer in place and having parts broken away and in section.

Figure 2 is a view of the retainer of Figure 1 taken in the direction of arrows 2—2 of that figure.

Figure 3 is a cross section view of the retainer taken in the direction of arrows 3—3 of Figure 1.

Figure 4 is a perspective view of the retainer of Figure 1 prior to installation.

The retainer 10 is preferably made in the form of a longitudinally extending strap or length of material 12 which is formed to have a lug 14 positioned adjacent one end 16. A plurality of apertures 20 are provided adjacent the end 18 of strap 12 and are linearly spaced relative to each other along the length of the strap. Lug 14 extends transversely of strap 12 and is preferably formed integrally therewith.

Lug 14 is provided with at least two annular barbs including an upper barb 24 and a lower barb 26. Other barbs may be provided if desirable. The outer end 28 of the lug 14 may be rounded as illustrated to permit easy insertion of the lug through an opening in the supporting structure to which the retainer is to be attached. A recess 30 is formed with lug 14 and extends through the end 16 of strap 12 and into the interior of the lug. Recess 30 terminates within the rounded end 28 of the lug.

The lug may be readily inserted in an aperture by collapsing its outer wall slightly in order that annular barbs 24 and 26 may pass through the aperture with a minimum amount of interference. If the retainer is made of a sufficiently elastic material an installing tool similar to a blunt awl may be inserted in recess 30 and the lug 14 may be stretched along its axis so that its overall circumference is sufficiently decreased to permit easy insertion in a supporting structure aperture. The lug is illustrated as passing through aperture 32 of support wall 34. The support wall is shown as being relatively thin so that its surface 36 is engaged by the extreme annulus 38 of barb 26 throughout its circumference and its surface 40 is engaged by the surface of the strap 12 from which lug 14 extends. The outer diameter of barb 26 is sufficiently larger than the diameter of apertures 32 to prevent the removal of the lug 14 under normal conditions. The main body or strap portion of the retainer is thus held adjacent support wall surface 40.

The retainer 10 may be attached to a support wall as described above during any desirable assembly operation. It may be placed in position prior to the positioning of the article to be secured to the support wall. It is effectively held in position and is not subject to displacement during normal handling operations. When it is desired to secure one or more articles 42 in the desired position, such articles are positioned at approximately the center of strap 12. The strap is then reversely bent so that the strap body substantially encircles the articles 42 as is shown in Figures 1 and 2. One of the appropriate apertures 20 is then positioned over end 28 of lug 14 and the strap is pushed toward the base of that lug. The annular barb 24 formed on the lug above barb 26 provides a lock for the end 18 of the strap. The portion of the retainer including the aperture through which the lug is retained is snapped over the barb 24 and retained in the position illustrated in Figures 1 through 3. Several of the apertures 20 are provided so that the retainer may be adjusted for use with one or more articles having various overall circumferences.

The articles 42 are thus held in position adjacent support wall 34 within the loop formed by the strap body. It may be held tightly in position by selecting the proper aperture 20 or it may be held loosely in position by selecting an appropriate aperture for that purpose.

The retainer will permit limited rotation of the retainer with the articles 42 about the axis of lug 14 without danger of removing the retainer from the support wall. It will also strongly resist movement of articles 42 in a direction generally parallel to the axis of the lug since the annular barbs provide an effective lock. The plastic materials from which the retainer may be manufactured are preferably sufficiently resilient to permit unlocking of the lugs when desired so that the articles 42 may be readily removed if necessary. The retainer may also be replaced with ease.

What is claimed is:

1. A flexible retainer having a longitudinally extending body having at least one aperture formed in one end thereof and a transversely extending lug integrally formed therewith adjacent the end thereof opposite said apertured end, said lug having a body section of equal or smaller size than said aperture and a plurality of axially spaced annular barbs formed thereon larger than said aperture and spaced from said retainer body, said lug further having a hollow recess formed therein and extending through said barbs to permit limited resilient radial collapsing of said lug, said retainer being attached by said lug to a support structure and to an article to be supported by said lug and said body aperture.

2. In combination, a retainer and a support structure for said retainer and an article to be supported on said structure by said retainer, said support structure having an aperture formed therein, said retainer having a hollow lug integrally formed therein adjacent one end and an aperture formed therein in spaced relation to said lug, said lug having a first annular barb formed thereon larger than said support structure aperture and axially spaced on said lug from said retainer, said support structure aperture receiving said lug therethrough, said first annular barb locking said retainer to said support structure, said lug further having a second barb formed thereon in axially spaced relation to said first annular barb and larger than said retainer aperture, said retainer being reversely bent to form a loop receiving said article being supported, said lug being received through said retainer aperture to a point intermediate said first and second annular barbs whereby said second annular barb is interlocked with the apertured portion of said retainer.

References Cited in the file of this patent

UNITED STATES PATENTS

| | | |
|---|---|---|
| 809,993 | Sorg | Jan. 16, 1906 |
| 1,479,150 | Mellus | Jan. 1, 1924 |
| 2,180,960 | Kennedy | Nov. 21, 1939 |
| 2,548,104 | Frison | Apr. 10, 1951 |
| 2,709,290 | Rosenthal | May 31, 1955 |
| 2,759,390 | Edwards | Aug. 21, 1955 |
| 2,896,889 | Hershberger et al. | July 28, 1959 |

Notice of Adverse Decision in Interference

In Interference No. 93,260 involving Patent No. 2,974,916, S. C. Richey, Flexible retainer, final judgment adverse to the patentee was rendered July 2, 1964, as to claims 1 and 2.

[*Official Gazette August 25, 1964.*]